US012359348B2

(12) United States Patent
Atkins et al.

(10) Patent No.: US 12,359,348 B2
(45) Date of Patent: Jul. 15, 2025

(54) SYSTEMS AND METHODS FOR MANUFACTURING CARBON FIBER FROM COAL

(71) Applicant: CARBON HOLDINGS INTELLECTUAL PROPERTIES, LLC, Sheridan, WY (US)

(72) Inventors: Charles Agee Atkins, Sheridan, WY (US); Christopher L. Yurchick, McDonald, PA (US)

(73) Assignee: CARBON HOLDINGS INTELLECTUAL PROPERTIES, LLC, Ranchester, WY (US)

( * ) Notice: Subject to any disclaimer, the term of this patent is extended or adjusted under 35 U.S.C. 154(b) by 819 days.

(21) Appl. No.: 17/374,904

(22) Filed: Jul. 13, 2021

(65) Prior Publication Data

US 2022/0010462 A1   Jan. 13, 2022

Related U.S. Application Data

(60) Provisional application No. 63/051,255, filed on Jul. 13, 2020.

(51) Int. Cl.
*D01F 9/15* (2006.01)
*C01B 32/19* (2017.01)
(Continued)

(52) U.S. Cl.
CPC ............... *D01F 9/15* (2013.01); *C01B 32/19* (2017.08); *H01M 4/583* (2013.01); *H01M 10/54* (2013.01); *H01M 2004/027* (2013.01)

(58) Field of Classification Search
CPC .......... D01F 9/15; C01B 32/19; H01M 4/583; H01M 10/54; H01M 2004/027;
(Continued)

(56) References Cited

U.S. PATENT DOCUMENTS

| 3,595,946 A | 7/1971 | Joo et al. | |
|---|---|---|---|
| 4,902,492 A * | 2/1990 | Beneke | D01F 9/15 |
| | | | 423/447.6 |

(Continued)

FOREIGN PATENT DOCUMENTS

| JP | S62170528 A | 7/1987 |
|---|---|---|
| JP | 2006307358 A | 11/2006 |

(Continued)

OTHER PUBLICATIONS

Suthaharan, Machine Learning Models and Algorithms for Big Data Classification, Integrated Series in Information Systems 2016; 36: 1-359 (Year: 2016).*

(Continued)

*Primary Examiner* — Daniel C. McCracken
(74) *Attorney, Agent, or Firm* — Dorsey & Whitney LLP

(57) ABSTRACT

Embodiments discloses herein relate to methods of processing coal. A method to process coal includes subjecting raw coal to a liquefaction process to form a pitch resin and refining the pitch resin to produce a mesophase pitch. The method further includes subjecting the mesophase pitch to a low crystallinity spinning process to form a raw fiber. The raw fiber is then further subjected to a stabilization process configured to oxygen cross-link the fiber to form a stabilized fiber and then subjecting the stabilized fiber to a carbonization process to form a carbon fiber.

8 Claims, 7 Drawing Sheets

(51) Int. Cl.
  *H01M 4/02*    (2006.01)
  *H01M 4/583*   (2010.01)
  *H01M 10/54*   (2006.01)

(58) Field of Classification Search
  CPC ....... H01M 4/587; H01M 4/625; Y02E 60/10;
                                          Y02W 30/84
  See application file for complete search history.

(56) References Cited

U.S. PATENT DOCUMENTS

| | | | |
|---|---|---|---|
| 5,340,511 | A | 8/1994 | Morgan et al. |
| 5,538,621 | A | 7/1996 | Kalback et al. |
| 5,795,843 | A | 8/1998 | Endo |
| 8,206,640 | B2 | 6/2012 | Vakili et al. |
| 2003/0138370 | A1 | 7/2003 | Adams et al. |
| 2010/0254887 | A1 | 10/2010 | Leon |
| 2015/0284880 | A1 | 10/2015 | Alnasleh et al. |
| 2016/0272499 | A1 | 9/2016 | Zurutuza Elorza et al. |
| 2016/0348283 | A1 | 12/2016 | Jo et al. |
| 2019/0194544 | A1 | 6/2019 | Atkins et al. |
| 2019/0194828 | A1 | 6/2019 | Atkins et al. |
| 2020/0167647 | A1 | 5/2020 | De Waele et al. |
| 2020/0299586 | A1 | 9/2020 | Atkins et al. |
| 2020/0299589 | A1 | 9/2020 | Atkins et al. |

FOREIGN PATENT DOCUMENTS

| | | | | |
|---|---|---|---|---|
| KR | 20170131693 A | | 11/2017 | |
| WO | WO 2019/126782 | * | 6/2019 | .............. C01C 3/00 |
| WO | 2020045243 A1 | | 3/2020 | |
| WO | 2021253010 A1 | | 12/2021 | |

OTHER PUBLICATIONS

Baily, How Can We Trust AI If We Don't Know How It Works, accessed online at https://www.scientificamerican.com/article/how-can-we-trust-ai-if-we-dont-know-how-it-works/ (Oct. 3, 2023) (Year: 2023).*

Owen, Aaron, "Assisted Development of Mesophase Pitch With Dispersed Graphene and Its Resulting Carbon Fibers" (2018). Theses and Dissertations—Mechanical Engineering. 126., accessed online at: https://uknowledge.uky.edu/me_etds/126 (2018), pp. 1-98 (Year: 2018).*

Lee, et al., Effect of Process Condition on Tensile Properties of Carbon Fiber, Carbon Letters 2011; 12(1): 26-30 (Year: 2011).*

Zhu, et al., Graphene and Graphene Oxide: Synthesis, Properties, and Applications, Adv. Mater. 2010; 22: 3906-3924 (Year: 2010).*

International Search Report and Written Opinion dated Jan. 13, 2022 as received in PCT International Application No. PCT/US2021/041492.

International Search Report and Written Opinion dated Oct. 14, 2021 as received in PCT International Application No. PCT/US2021/035286.

Li, Xiao , et al., "Coal Liquefaction Residues Based Carbon Nanofibers Film Prepared by Electrospinning: An Effective Approach to Coal Waste Management", ACS Sustainable Chem. Eng., Feb. 25, 2019, 5742-5750.

Yue, Zhongren , et al., "Meltblown Solvated Mesophase Pitch-Based Carbon Fibers: Fiber Evolution and Characteristics", Journal of Carbon Research, vol. 3 issue 3 (Aug. 8, 2017): pp. 1-14, entire document, but especially: abstract, p. 10 para 2-3, p. 11 para 2.

Yue, Zhongren , et al., "Solvated mesophase pitch-based carbon fibers: thermal oxidative stabilization of the spun fiber", Journal of Material Science, vol. 52 (Mar. 27, 2017): pp. 8176?8187, entire document.

EP21814134.9 Partial Supplementary European Search Report dated Jun. 13, 2024 (13 pages).

EP21842332.5 Extended European Search Report dated Sep. 3, 2024. 11 pages.

EP21842332.5 Partial Supplementary European Search Report dated Jun. 13, 2024 (13 pages).

Ardary et al. Carbon-Fiber Thermal Insulation. Union Carbide Corporation Nuclear Division Oak Ridge; Y-12 Plant Publication; Mar. 9, 1972. pp. 1-43.

Mochida et al. Blending Mesophase Pitch to Improve its Properties as a Precursor for Carbon Fire. Part 1: Blending of PVC Pitch into Coal Tar and Petroleum-Derived Mesophase Pitches. Journal of Materials Science 1988; 23; 670-677.

Mochida et al. Modification of Mesophase Pitch by Blending. Part 2: Modification of Mesophase Pitch Fibre Precursor with Thermoresisting Polyphenyleneoxide (PPO). Journal of Materials Science 1988; 23; 678-686.

Yue et al. Activated Carbon Fibers from Meltblown Isotropic Pitch Fiber Webs for Vapor Phase Adsorption of Volatile Organic Compounds; Chemical Engineering Journal 2017; 330: 183-190.

* cited by examiner

SYSTEMS AND METHODS FOR MANUFACTURING CARBON FIBER FROM COAL

CROSS REFERENCE TO RELATED APPLICATION

This application is a non-provisional patent application of, and claims priority to U.S. Provisional Patent Application No. 63/051,255, filed 13 Jul. 2020, entitled "SYSTEMS AND METHODS FOR MANUFACTURING CARBON FIBER FROM COAL" the disclosure of which is incorporated by reference in its entirety.

FIELD

The described embodiments relate generally to carbon products and carbon based processing methods. More particularly, the present embodiments relate to low-density carbon fiber and systems and methods for manufacturing the same from coal.

BACKGROUND

Fiber materials are used for many different applications in a wide variety of industries, such as the commercial aviation, recreation, industrial and transportation industries. Carbon fiber is used in a variety of composite materials, by virtue of its excellent properties such as high strength, high elastic modulus, and high electrical conductivity.

Carbon fibers produced using previously known methods such as conventional carbon fiber (e.g., polyacrylonitrile (PAN)-based carbon fiber, pitch-based carbon fiber or cellulose-based carbon fiber), which can be produced through carbonization of organic fiber through thermal treatment exhibits low electrical conductivity and may be costly to develop. As such, manufacturers and users of carbon fibers continue to seek new and improved methods of forming carbon fibers.

SUMMARY

Embodiments discloses herein relate to methods for manufacturing carbon fiber from coal. Embodiments herein also relate to producing graphene. The methods disclosed herein may include a continuous process. In an example, the methods disclosed herein can include the direct air capture system including a coal-derived electroactive polymer to capture CO2 from a gaseous stream.

Many systems and methods described herein can use a low-cost and high-yielding coal-based pitch precursor that is advantageous from conventional high-cost and low-yielding PAN-based or cellulosic-based insulative fiber. The systems and methods described herein also can provide carbon fiber products in a manner that allows low cost pitch-based carbon fiber to fulfill all useful applications in a way that significantly reduces costs versus incumbents.

In some embodiments, a method of processing coal can include subjecting raw coal to a liquefaction process to form a pitch resin. The pitch resin can be refined to produce a pitch with a degree of anisotropy between about 20% and about 99%. The method of processing coal can include refining the pitch to produce a mesophase pitch. The mesophase pitch can be subjected to a low-crystallinity spinning process to form a raw fiber and subjecting the raw fiber to a fiber stabilization process using oxygen to produce stabilized carbon fiber. The method can further include subjecting the stabilized carbon fiber to a carbonization process to form a carbonized or calcined carbon fiber. In some embodiments, the pitch or pitch resin can include an isotropic pitch.

In some embodiments, the method of processing coal can further include distilling coal tar to produce the pitch or pitch resin. In some embodiments, the method of processing coal can further include heat treating coal tar to produce the pitch or pitch resin. The method can further include utilizing a machine learning enabled regressive model to optimize parameters for producing carbon fiber. In some embodiments, the method can further include blending graphene with the mesophase pitch. In some embodiments, the method can include stabilizing the raw fiber. Stabilizing the raw fiber can include heating the pitch to a stabilization temperature of about 280° C. and maintaining the pitch at the stabilization temperature for about 2 hours.

In some embodiments, subjecting the raw fiber or stabilized fiber to a carbonization process can include heating the raw fiber to a carbonization temperature of about 1000° C. and maintaining the raw fiber at the carbonization temperature for about 30 minutes. In some embodiments, subjecting the raw fiber or stabilized fiber to a carbonization process includes heating the raw fiber in an inert gas environment. The carbon fiber produced by the method of processing coal can include a tensile strength of from about 1.51 GPa to about 1.64 GPa, and a modulus of about 356 GPa.

In some embodiments, a method of producing graphene can include mixing coal with a cellulose-enriched biomass to form a biomass mixture, grinding the biomass mixture into a powder, subjecting the powder to a graphitization process to form a graphite, acid leaching the graphite to remove impurities, and shear mixing the graphite to form a graphene. In some embodiments, the cellulose-enriched biomass includes at least one of wood sawdust, paper waste, and bamboo. In some embodiments, the method of producing graphene can include preheating the cellulose-enriched biomass prior to mixing coal with the cellulose-enriched biomass. Preheating the cellulose-enriched biomass can include heating the cellulose-enriched biomass at ambient pressure to a temperature of between about 400° C. and about 600° C. and maintaining the temperature for about 1-6 hours.

In some embodiments, the graphitization process includes evacuating a ceramic vessel including the powder to a vacuum, injecting about 0.5%-10% by molar ratio of air into the vessel, heating of the powder in a ceramic vessel to a temperature of about 1,800° C.-2,600° C. and maintaining the temperature for about 1-8 hours, cooling the powder to ambient temperature, and repeating the heating and cooling until the coal is graphitized. In some embodiments, the method of producing graphene can include washing the graphite with distilled water after acid leaching the graphite and oven drying the graphite. In some embodiments, acid leaching the graphite includes treating the graphite with at least one of sulfuric acid and nitric acid. The impurities can include metal oxides.

In some embodiments, a method of producing graphene can include separating a graphite anode comprising a graphite lattice from a spent battery, purifying the graphite anode, and shear mixing the graphite lattice to isolate a graphene sheet from the graphite lattice. In some embodiments, purifying the graphite anode can further include soaking the graphite anode in N-Methyl-2-Pyrrolidone (NMP).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
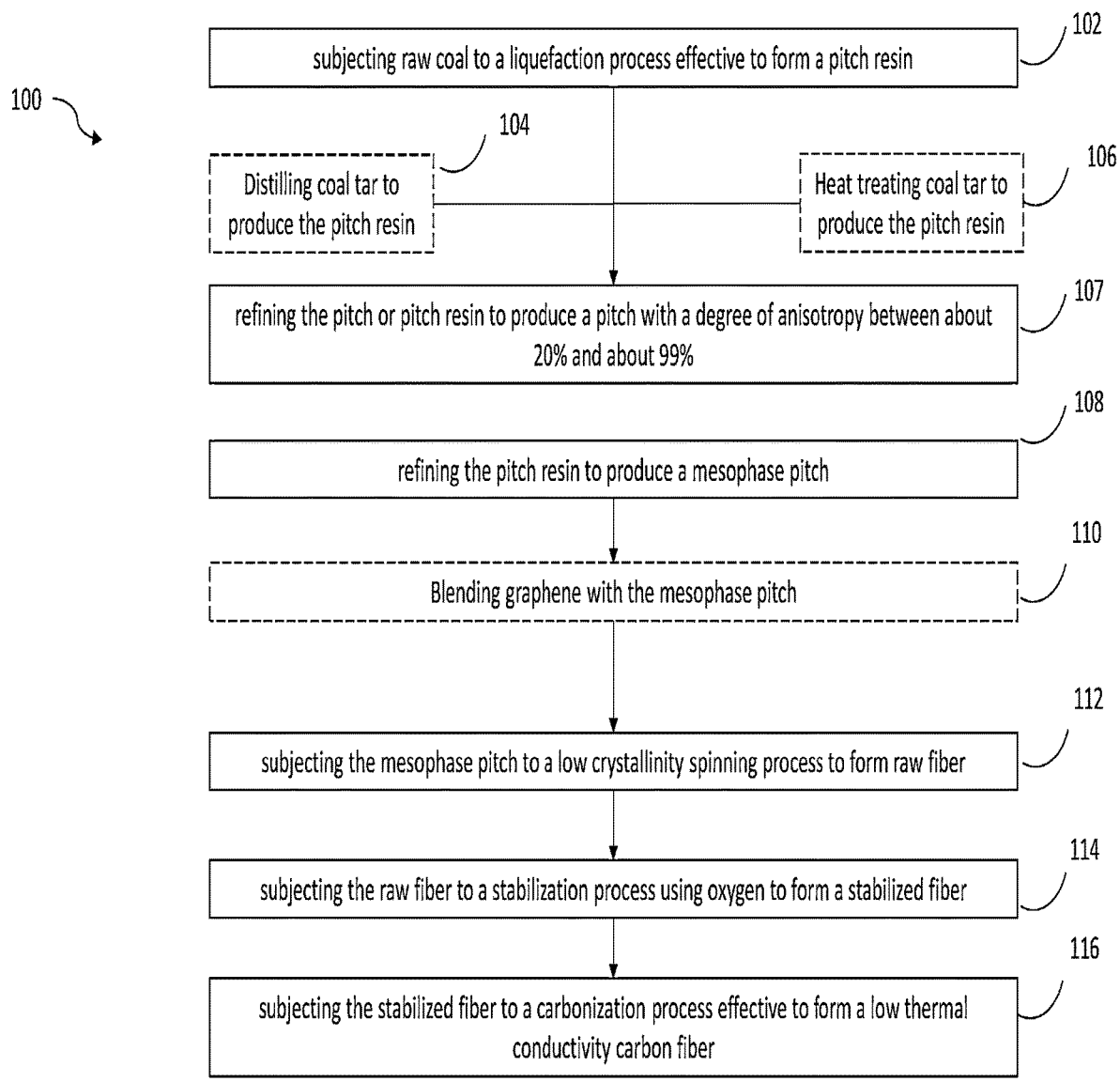
FIG. 1 is a flow chart of a method of processing coal, according to an embodiment.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, methods described herein can be performed in an order different from that described, and various steps can be added, omitted, or combined. Also, features described with respect to some embodiments can be combined in other embodiments.

Systems and methods for processing coal to form advanced carbon products are provided. The advanced carbon products can include one or more of carbon fibers, activated carbon, resins, graphene, materials for use in batteries, materials for use in building and construction, or combinations thereof. The systems and methods provided herein can include processing of pitches made from coal, as well as products formed or manufactured by the systems and methods. Systems and methods described herein promote the production of low-cost low thermal conductivity carbon fiber products. For example, many carbon fiber products produced according to this disclosure have lower density than conventional carbon fiber products produced from similar materials. The low-density carbon fiber product retains heat, thus providing the carbon fiber product with properties to lower the thermal conductivity relative to traditional carbon fibers.

The low-thermal conductivity carbon fiber products produced according to many of the systems and methods described herein are unexpected to those skilled in the technology. Many embodiments of the systems and methods described herein enhance the conversion of coal-based pitch intermediate products into useful conversion products, such as high-carbon containing pitch fiber products with low-thermal conductivities. These products can be suitable as thermal insulation materials and/or low-density carbon fibers. In particular, the present techniques utilize specially designed systems and one or more blend additives for tuning physical properties of the carbon fibers, such as at least one of the density (specific gravity) and/or the thermal conductivity of the carbonized fiber. Many systems and methods described herein can use a low-cost and high-yielding coal-based pitch precursor that is advantageous from conventional high-cost and low-yielding PAN-based or cellulosic-based insulative fiber. The systems and methods described herein also can provide carbon fiber products in a manner that allows low cost pitch-based carbon fiber to fulfill all useful applications in a way that significantly reduces costs versus incumbents. For example, the systems and methods can produce affordable carbon fiber insulation for improving energy efficiency in the built environment as an alternative to fiberglass insulation.

FIG. 1 is a flow diagram of a method 100 for processing coal effective to form a low thermal conductivity carbon fiber, according to an embodiment. For example, the method 100 can include an act 102 of subjecting a raw coal to a liquefaction process effective to form a liquid pitch resin. Coal liquefaction is a process in which coal is converted into liquid. There are several processes used to accomplish this task, the two most common being the indirect route and the direct route. In some embodiments, the indirect route is composed of 2 steps: First, the coal can be gasified with steam and oxygen to produce a synthesis gas (syngas), which is then cleaned to rid of dust, tar, and acid gases. The second step reacts the synthesis gas with a catalyst in the Fischer-Tropsch process, which converts the syngas into a range of hydrocarbons. For example, the hydrocarbon may include a pitch resin. In the direct route, coal is pulverized and reacted with a catalyst, and then hydrogen is added under high pressures and temperatures in the presence of a solvent to produce hydrocarbons such as liquid pitch resin. In some embodiments, the pitch resin includes an isotropic pitch.

The method 100 may also include an act 104 of distilling coal tar to produce the pitch resin or an act 106 of heat treating coal tar to produce the pitch resin. The method 100 may also include an act 107 of refining the pitch or pitch resin to produce a pitch with a degree of anisotropy between about 20% and about 99%. In some embodiments, the method 100 may also include an act 108 of refining the pitch or pitch resin to produce a mesophase pitch. In some examples, processing facilities can refine coal-derived isotropic pitch and produce mesophase pitch that is suitable for melt spinning pitch CF precursors. Generally, coal tar pitch can be produced by either distillation or heat treatment of coal tar, which is a by-product of the production of coke and coal gas from coal that can be extracted chemically. Coal tar pitch is composed of thousands of compounds with wide molecular weight distribution and poorly defined chemical structure, which makes it undesirable to prepare carbon fibers. Processing facilities and procedures described herein can remove impurities from the coal, such as water, metal oxides, and sulfides, and can then derive value-added carbon materials, graphene, and pitch. The processing parameters, such as the pyrolysis temperature and duration, can be optimized to get the best quality spinnable mesophase pitch possible from isotropic coal-tar pitch suitable for melt spinning carbon fibers. In some examples, graphene oxide obtained from coal can be reduced to graphene by a heat treatment method.

Carbon fibers produced from mesophase pitch have a highly orientated structure in which carbon crystallites are preferentially aligned parallel to the fiber axis and have high strength and a high modulus of elasticity. In some embodiments, the production of mesophase pitch from isotropic coal-tar pitch or petroleum pitch includes heat soaking the precursor pitch at temperatures between 350° C. and 500° C. under an inert atmosphere. A temperature of around 400° C. can be used to produce mesophase pitch with the desired rheological properties for spinning. At this temperature, it takes a long time, typically around 24 hours, to produce mesophase pitch from coal-tar or petroleum pitch. To produce a suitable mesophase pitch for production of carbon fibers it is beneficial to remove the solids, ash-forming material and coke, which can produce defects in the fibers and lower their tensile strength.

In some embodiments, the refining process includes a mechanical filtration. In some embodiments, the filtration process includes a chemical filtration. Act 108 may filter the liquid pitch resin to remove mineral matter and heavy metals included in the pre-filtered raw coal. In some embodiments, the filtration process may be conducted at elevated temperatures. The elevated temperatures can include temperatures between about 60° C. and about 300° C. In some embodiments, act 108 may include heating the resin pitch temperature to about 60° C. or greater, about 100° C. or greater, about 150° C. or greater, about 200° C. or greater, about 300° C. or greater, or in ranges of about 60° C. to about 100° C., about 100° C. to about 200° C., or about 200° C. to about 300° C. The final temperature may be about 200° C. or greater, about 250° C. or greater, or about 300° C. or greater.

The method 100 can also include an act 110 of blending graphene with the mesophase pitch, in some embodiments. In some examples, the methods described herein can derive valuable advanced carbon products, such as graphene and mesophase pitch, from coal, and use them as raw materials to fabricate high-performance, graphene-reinforced carbon fibers (CFs). Methods described herein can prepare high-quality graphene and mesophase pitch from coal and commercial coal-derived isotropic pitch. This graphene and mesophase pitch can be blended to fabricate low-cost high-performance pitch-based carbon fibers. In some examples, the production of CF possessing from coal-based precursors can be suitable for automotive structural applications and can enable broader CF composite deployment in next-generation lightweight vehicle designs.

In some embodiments, a 0.1 wt % of shear exfoliated graphene can be mixed with mesophase pitch to prepare the pitch/graphene precursor fibers. The obtained pitch and pitch/graphene precursor fibers are processed by using a series of heat treatment process, with a stabilization process at 280° C. for 2 h in the air and then carbonized at 1000° C. for 30 min under Ar gas protection. In some embodiments, a pitch CF shows some large pores on the surface of cross-section, while the pitch/graphene CF has much denser cross section, which indicates the structure modification function of the added graphene. This function was further emphasized as the pitch/graphene CF also demonstrated significantly improved mechanical properties compared to pure pitch CF, with strength increased from 1.51 to 1.64 GPa, and modulus increased from 220 GPa to 356 GPa. The balance between the ductility and strength can be further tuned by changing the concentration of graphene and conversion parameters. These successful experiments and encouraging results give us confidence that we can fulfill the proposed activities and meet the set milestones and objectives of the proposed project. The obtained high-quality mesophase pitch and graphene can be used as precursor materials to fabricate pitch/graphene carbon-fibers. A series of pitch/graphene blends with different graphene concentration with desirable characteristics can be melt-spun into fibers with a custom spin line. Spinning parameters, such as extrusion temperatures, quench flow rates, take up rate, and draw ratio can be explored to develop an optimal precursor microstructure for conversion to CF.

Similar results have been reported for carbon nanotubes (CNTs) and other graphene polymer systems. Some reports showed that a low concentration of CNTs/graphene (less than 1.0 wt %) could significantly enhance the mechanical properties. However, after passing a critical content, the mechanical properties of the composites start to deteriorate as CNT/graphene concentration increase.

In an embodiment, the liquid and filtered pitch resin can then be subjected to a low crystallinity spinning process effective to form a raw fiber in act 112. In many embodiments, the systems and methods include at least one of two processes for disrupting the highly-densified crystalline graphitic structure associated with carbon fibers. The two processes for disrupting the highly-densified crystalline graphitic structure can include physically altering spinning conditions in a variable-crystallinity spinning process and chemically altering pitch composition with one or more blend additives. Spinning conditions can be physically altered in a low crystallinity spinning process to be more conducive to disrupting liquid crystalline formation. In some embodiments, the spinning conditions can be physically altered by one or more of a turbulent flow spinneret design, low draw ratios on the green spun fiber, a melt blown solvated spinning system versus neat resin melt spinning, use of flow inverters or fritted flow redistributors in spinneret capillary channel, introduction of voids (such as nano-sized bubbles) in the spun fiber via foaming, and/or use of specialized spinnerets for formation of hollow fibers with one or more cross-sectional holes, or combinations thereof.

In some embodiments, the method 100 can also include adding a blend additive to the pitch resin before or during the low crystallinity spinning process of act 112. In some embodiments, the blend additive can include one or more of an isotropic pitch, a pitch with a level of anisotropy, or a thermoplastic blend additive. Pitch is generally isotropic, but can be made anisotropic through heat treatments. Isotropic pitch and anisotropic pitch are different not only in carbonaceous precursors but also in their optical texture, microstructure, and physical properties. The additive can improve the strength and rigidity of the raw fiber. The pitch composition also can be chemically altered with one or more blend additives to be more conducive to disrupting liquid crystalline formation. The result of including one or more blend additives can be a carbon fiber that has a lower density than conventionally formed carbon fibers. The resulting carbon fiber can then include properties more similar or even superior to the properties of Rayon carbon fiber, such as a lower thermal conductivity. In some embodiments, the pitch composition can be altered by utilizing isotropic pitch and/or an anisotropic pitch with a degree of anisotropy between 0% and 80% as a blend additive (or neat) instead of high discotic liquid-crystalline containing mesophase pitches. In some embodiments, the blend additive can include one or more of an anisotropic pitch of varying degrees.

In some embodiments, the pitch composition can be altered by utilizing oxygen-containing additives such as an oxygen containing polymeric material. In some embodiments, the pitch composition can be altered by utilizing one or more compounds containing hetero-atoms such as oxygen or nitrogen. In some embodiments, the pitch composition can be altered by utilizing one or more thermoplastic blend additives (phenolic resins, lignin, etc.) containing hetero-atoms such as oxygen or nitrogen. Blending materials including hetero-atoms (such as oxygen) with the pitch while spinning fibers can lower the density of the fibers. Examples of the one or more thermoplastic blend additives containing hetero-atoms such as nitrogen or oxygen can include (but is not limited to) polyphenolic formaldehyde resin, lignin, polyethylene oxide, poly vinyl alcohol, poly-DL-lactide, polymethylmethacrylate, or combinations thereof. In some embodiments, one or more of the heteroatom containing additives can be derived from coal.

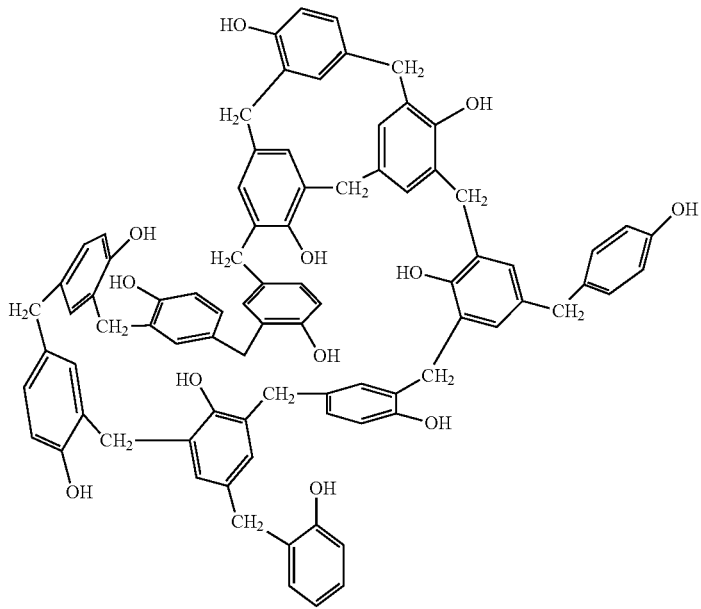

Polyphenolic formaldehyde resin

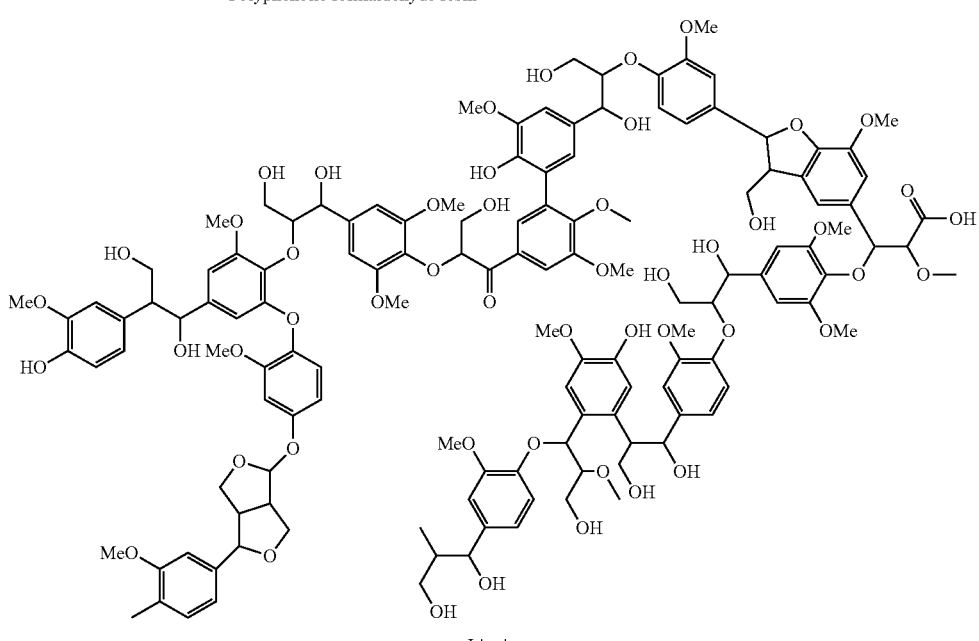

Lignin

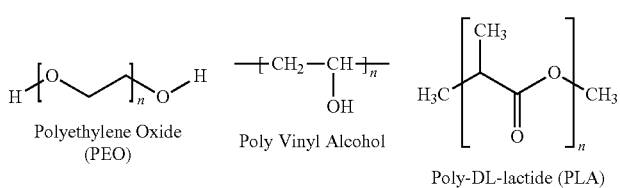

Polyethylene Oxide (PEO)   Poly Vinyl Alcohol   Poly-DL-lactide (PLA)

The physical and chemical processes for disrupting the highly-densified crystalline graphitic structure associated with carbon graphite fibers described above can alter the pitch-based carbon fibers to approach microstructure properties and resulting densities and insulative properties that are more commonly associated with cellulosic-based (Rayon) carbon fibers. Tables 1 and 2 provide a comparison of properties of PAN-based, PITCH-based, and Rayon-based carbon fibers.

TABLE 1

Carbon Fiber Mechanical Properties
Carbon Fiber Mechanical Properties

|  | PAN Based | PITCH Based | Rayon Based |
| --- | --- | --- | --- |
| Tensile Modulus (Mpsi) | 33-56 | 23-55 | 5.9 |
| Tensile Strength (Msi) | 0.48-0.35 | 0.2-0.25 | 0.15 |
| Elongation (%) | 1.4-0.6 | 0.9-0.4 | 25 |
| Density (g/cc) | 1.8-1.9 | 1.9-2.0 | 1.6 |
| Carbon Assay (%) | 92-100 | 97-99 | 99 |

TABLE 2

Rayon Carbon Fiber Properties

| Parameter | Characterization |
| --- | --- |
| Tensile strength | ~100 ksi; 685 MPa |
| Tensile modulus | ~6 Msi; 41 GPa |
| Thermal conductivity | 3.7 W/m-K |
| Ash content | 0.4 w % |
| Carbon Assay, w % | 96+ |

In some embodiments, the method 100 may also include an act 114. Act 114 includes subjecting the raw fiber to a stabilization process configured to oxygen cross-link the fiber to form a stabilized fiber. In some embodiments, the raw fiber can undergo a stabilization process where air (oxygen), and in some cases additional gases or vapors, are introduced to alter the linear atomic bonding of the fibers to a more thermally stable form. Raw carbon fibers must be stabilized prior to a calcination step of the overall process discussed below in act 114. The stabilization prevents the molecules within the carbon fiber from exhibiting relaxation and becoming unaligned during the calcination step. The stabilization maintains the integrity of the molecules and allows the fibers to remain in their solid form throughout the final processing steps.

In some embodiments, the stabilization of the fibers can be performed at a temperature of 200-300° C. and can include a resonance time of 30-120 minutes. In some embodiments, stabilizing the raw fiber includes heating the pitch to a stabilization temperature of about 280° C. and maintaining the pitch at the stabilization temperature for about 2 hours. During this resonance time, the fiber can be exposed to an atmosphere of air, which contains roughly 21% oxygen. Additional gases or vapors can be added the stabilization atmosphere to alter the reactions occurring within the pitch of the fibers. During act 114 including the stabilization, the fibers can be maintain under tension to prevent the relaxation and misalignment of the molecules with the pitch. Pitch-based carbon fibers may typically form esters and anhydride compounds within the pitch during act 114. The pitch-based fibers can also experience the loss of aromatic content during act 114.

The method 100 may also include an act 116. In act 116, the stabilized fiber can be subjected to a carbonization process effective to form a low thermal conductivity carbon fiber. In some embodiments, carbonization is a process by which the stabilized fiber is heated and any volatile products (liquid and gaseous) can be driven off, leaving a solid low thermal conductivity carbon fiber. In some embodiments, the carbonization process includes heating the raw fiber to a carbonization temperature of about 1000° C. and maintaining the raw fiber at the carbonization temperature for about 30 minutes. In some embodiments, act 116 of subjecting the raw fiber to a carbonization process includes heating the raw fiber in an inert gas environment.

While systems and methods for manufacturing low thermal conductivity carbon fiber insulation have been described above, other systems and methods for manufacturing, producing, or otherwise forming various advanced carbon materials are contemplated in this disclosure. These various advanced carbon materials can include other carbon fibers, activated carbon, resins, graphene, materials for use in batteries, materials for use in building and construction, or combinations thereof. Methods for producing carbon fibers, resins, graphene, and other advanced carbon materials (including activated carbon) from coal are disclosed in PCT Patent International Application No. PCT/US2018/067341 filed Dec. 21, 2018, the disclosure of which is incorporated herein, in its entirety, by this reference.

Figure 2:
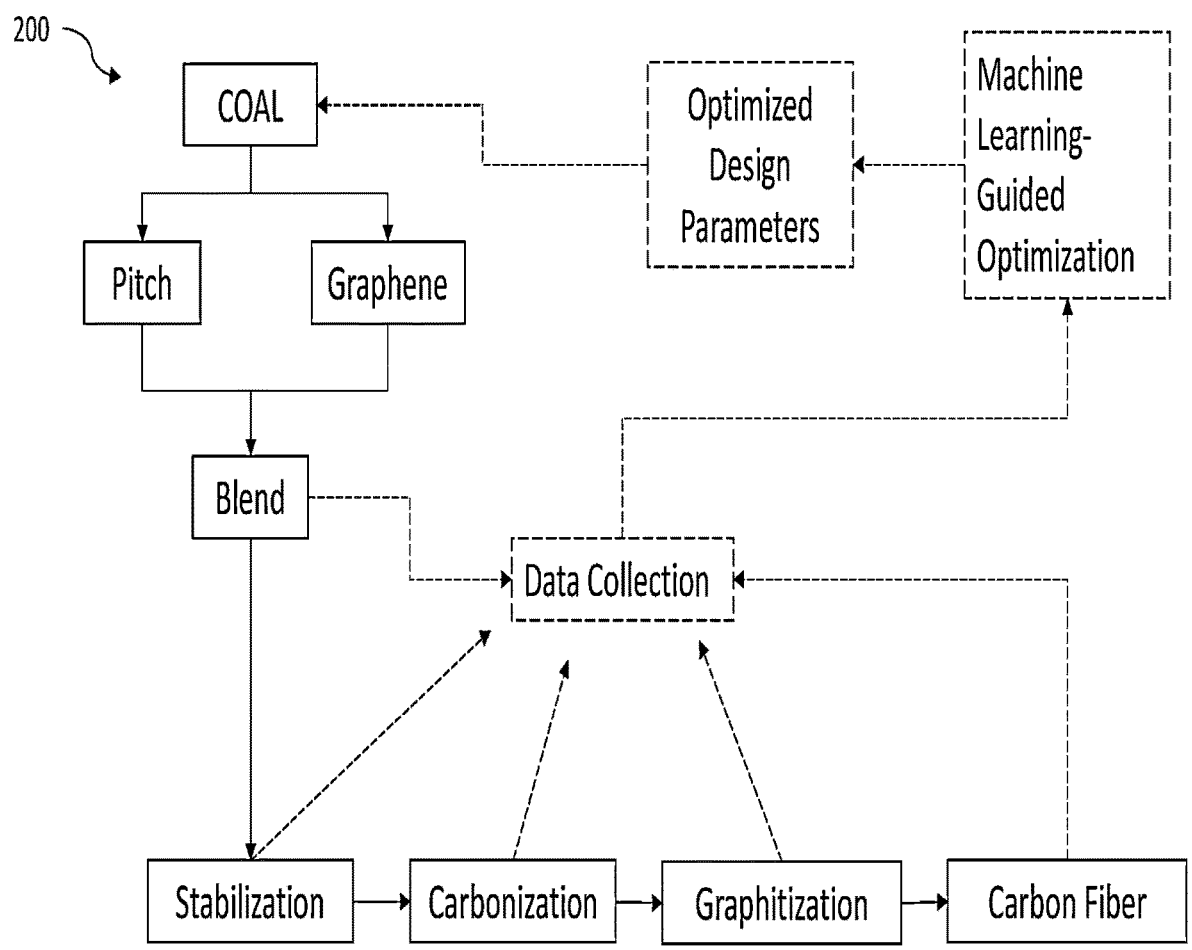
FIG. 2 illustrates the process flow of raw coal to carbon fiber, according to an embodiment.

FIG. 2 is a diagram illustrating the process flow of raw coal to carbon fiber including an optimization process. In some embodiments, the method 100 can include optimization process 200. The method 100 can include utilizing a machine learning enabled regressive model to optimize parameters for producing carbon fiber. In some examples, using a database of properties, a ML-enabled regressive model can be developed to optimize key parameters of the CF conversion process, which typically includes stabilization, carbonization, and graphitization of the precursor fibers, as illustrated in FIG. 2. Data can be used to train a regressive multivariate model. Instead of the typical necessity of experimentally iterating through a substantial amount of key parameters, such as blend loading, pre-stabilization treatment, stabilization and carbonization duration and temperature, among others, a regressive ML model can sufficiently deconvolute the impact of each individual variable with a much smaller dataset and be able to predict mechanical performance metrics, such as modulus, strain, and strength. With a high number of independent predictor . . . variables multicollinearity will prevent the predictive capability on an individual basis, but this will not harm the overall reliability of the model as a bundled set of predictors.

Generally, the pitch (coal tar pitch) can be produced by either distillation or heat-treatment of coal tar which is a by-product of the production of coke and coal gas from coal, and can be extracted chemically. In some examples, isotropic pitch from coal can be tuned for mesophase pitch synthesis. Specifically, heating and distillation treatment can be optimized to determine which process parameters result in an ideal mesophase pitch material and structure. This treatment can vary slightly with coal quality and mining origin, as various coal materials have different impurity contents. The key parameters to this extraction process can be iteratively optimized in conjunction with characterization techniques. Using collected data, observations of feeding ratio, spinning and conversion parameters can be used to develop a ML-enabled regressive model. By making predictions as to the relationship between individual variables and the resulting mechanical properties of the spun fiber, the model will begin to be able to help down select the key parameters and aid optimization.

Figure 3A:
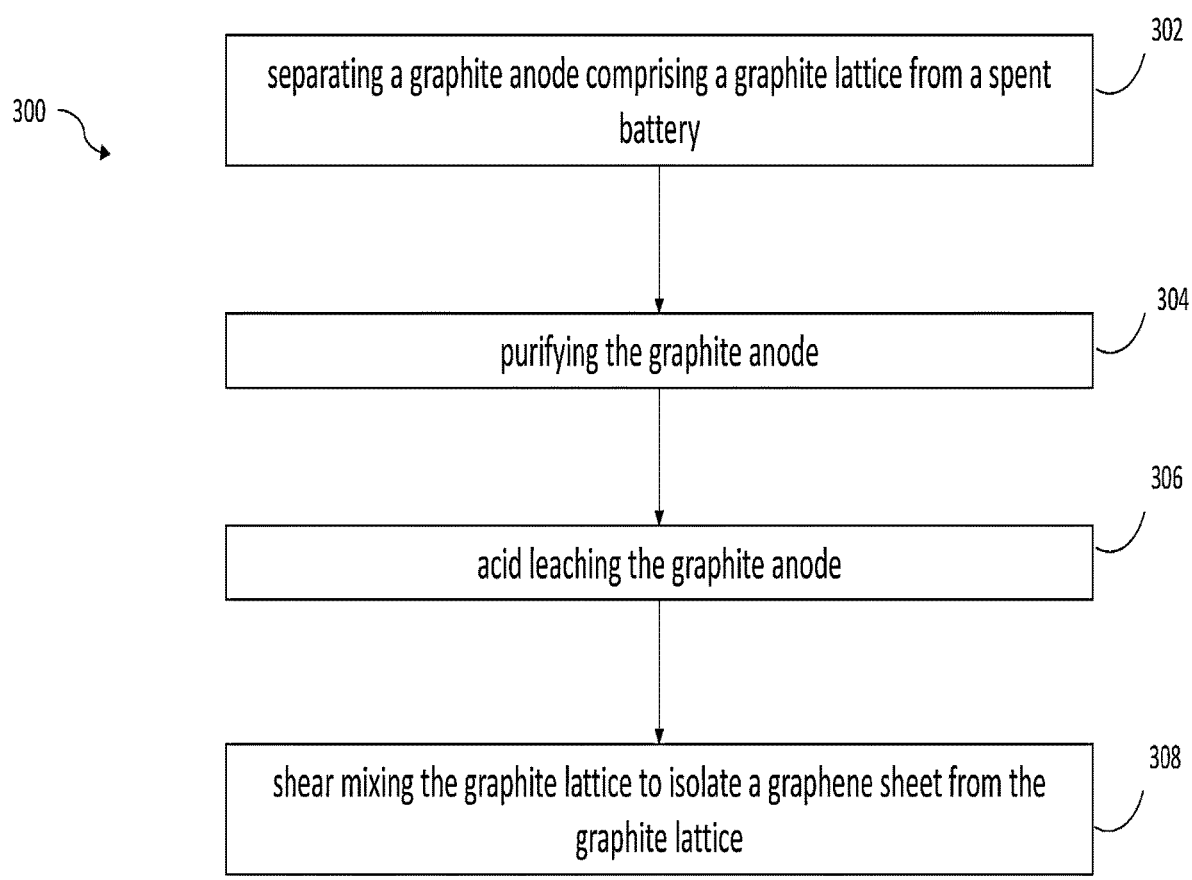
FIG. 3A is a flow chart of a method to produce graphene, according to an embodiment.

FIG. 3A is a flow chart of a method 300 to produce graphite, according to an embodiment. In some embodiments, the method 300 includes separating a graphite anode comprising a graphite lattice from a spent battery as shown in block 302. In some embodiments, the method 300 includes purifying the graphite anode as shown in block 304. Purifying the graphite anode can include soaking the graphite anode in N-Methyl-2-Pyrrolidone (NMP), in some embodiments. The method 300 further includes acid leaching the graphite anode, as shown in block 306. The method further includes shear mixing the graphite lattice to isolate a graphene sheet from the graphite lattice, as shown in block 308.

Figure 3B:
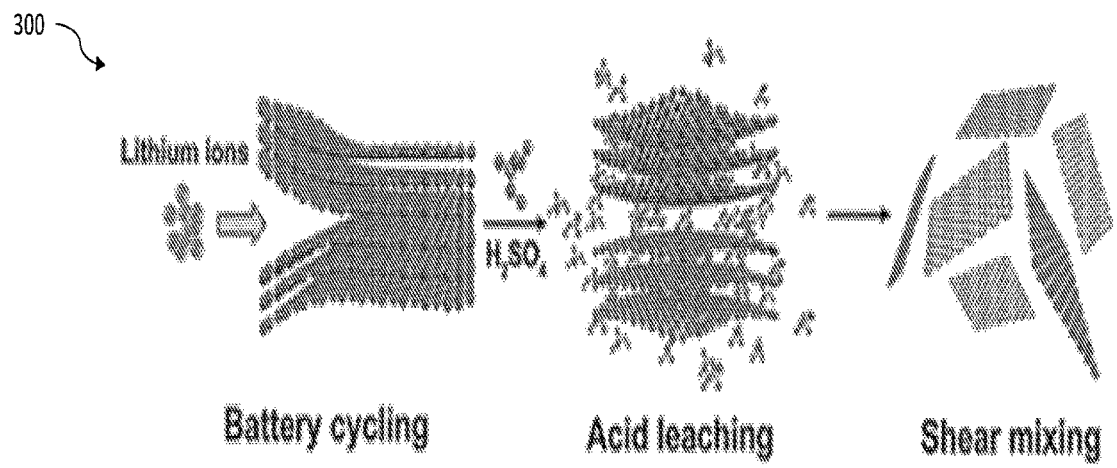
FIG. 3B illustrates a method to produce graphene, according to an embodiment.
Figure 3C:
FIG. 3C is a Transmission electron microscopy (TEM) image of $H_2SO_4$-treated anode graphite.
Figure 3D:
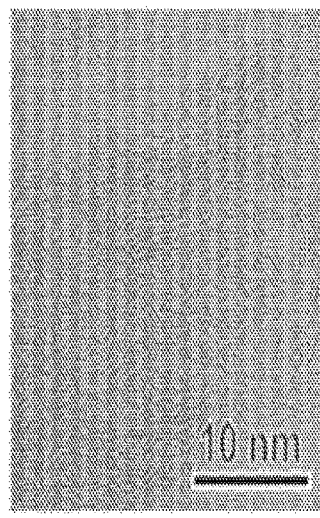
FIG. 3D is a High Resolution Transmission Electron Microscopy (HRTEM) image of the shear mixed graphene.
Figure 3E:
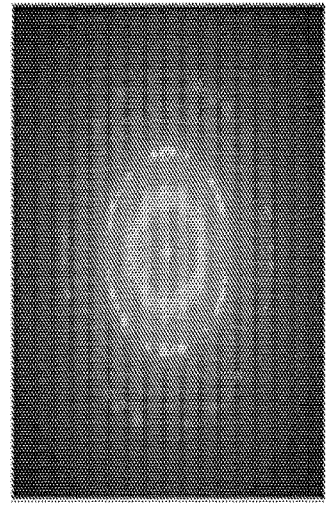
FIG. 3E is a Fast Fourier transform (FFT) of FIG. 3D.

FIG. 3B is a schematic that illustrates the method 300. In some examples, high-quality graphene can be fabricated by using a highly cost-effective shear mixing method from spent battery graphite anodes. The schematic of the graphite exfoliation by shear mixing is shown. The separated graphite anodes can be purified by NMP soaking and acid leaching to remove the impurities. Meanwhile, the acid leaching further expands graphite lattice and provides additives between each layer, which simplifies the isolation of graphene sheets. FIG. 3C shows a Transmission electron microscopy (TEM) image of $H_2SO_4$-treated anode graphite. Examples of the graphene sheets obtained through the method 300 are shown in FIGS. 3D and 3E. FIG. 3D is a High Resolution Transmission Electron Microscopy (HRTEM) image of the shear mixed graphene. FIG. 3E is a Fast Fourier transform (FFT) of FIG. 3D. Shear mixing time and frequency can be tuned to control the size of graphene nanoflakes. In some examples, the combination of acid leaching and shear mixing can enhance the efficiency of graphene fabrication. In some examples, this acid-leaching and shear mixing process can have a productivity of graphene (i.e. graphite to graphene) of over 80%.

Figure 4A:
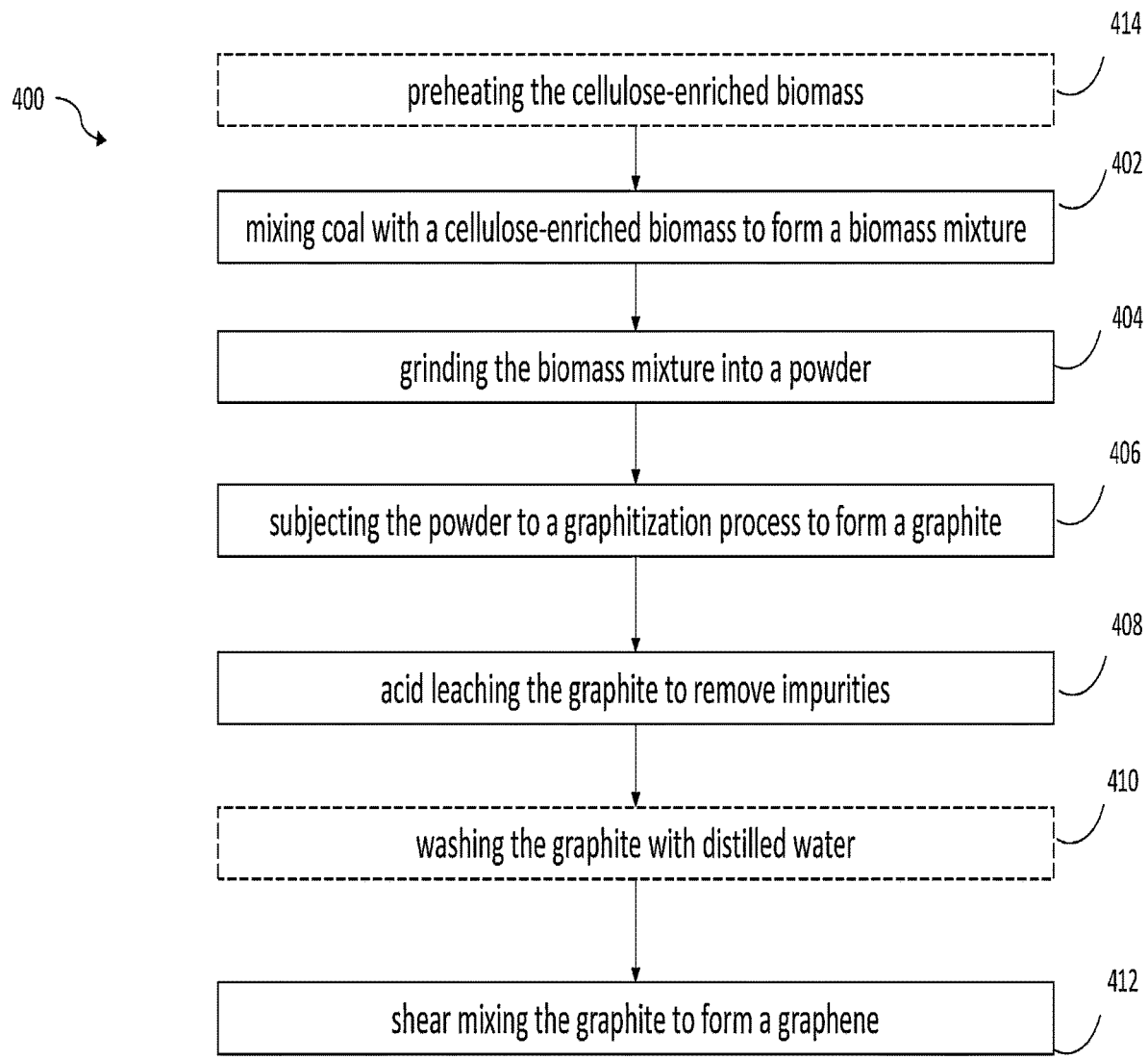
FIG. 4A is a flow chart of a method to produce graphene, according to an embodiment.

Referring now to FIG. 4A, a biomass-assisted method 400 to derive high-quality graphene from coal is illustrated. In some embodiments, coal can be mixed together with cellulose-enriched biomass, as shown in block 402. The cellulose-enriched biomass can include at least one of wood sawdust, paper waste, and bamboo. After that, the coal/biomass mixture can be ground into powders and uniformly mixed, as shown in block 404. In block 406, the mixture can then be subjected to a graphitization process to form a graphite. The obtained graphite will be further treated with acids and/or acid leached. In some embodiments, acid leaching the graphite includes treating the graphite with at least one of sulfuric acid and nitric acid to remove the remaining impurities, mostly metal oxides originating from the coal and biomass, as shown in block 408. Block 410 shows, in some embodiments, the graphite can be washed with distilled water until neutral. The graphite can then be oven dried. The dried sample can be transferred into a jar and slurred with distilled water. The jar of graphite suspension can be conducted with shear mixing, as shown in block 412, to harvest high-quality graphene. Through this task, high-quality graphene can be produced and suspended in distilled water for further use.

In some embodiments, the method 400 can further include preheating the cellulose-enriched biomass prior to mixing coal with the cellulose-enriched biomass, as shown in block 414. Preheating the cellulose-enriched biomass can include heating the cellulose-enriched biomass at ambient pressure to a temperature of between about 300° C. and about 800° C. and maintaining the temperature for about 1-6 hours or until suitable moisture content is obtained. The preheating is to remove moisture from the biomass. In some embodiments, the cellulose-enriched biomass can be preheated to a temperature of between about 400° C. and about 600° C. In some embodiments, block 414 may include heating the cellulose-enriched biomass at ambient pressure to a temperature of about 200° C. or greater, about 300° C. or greater, about 400° C. or greater, about 500° C. or greater, about 600° C. or greater, or in ranges of about 200° C. to about 400° C., about 400° C. to about 600° C., or about 300° C. to about 700° C.

Figure 4B:
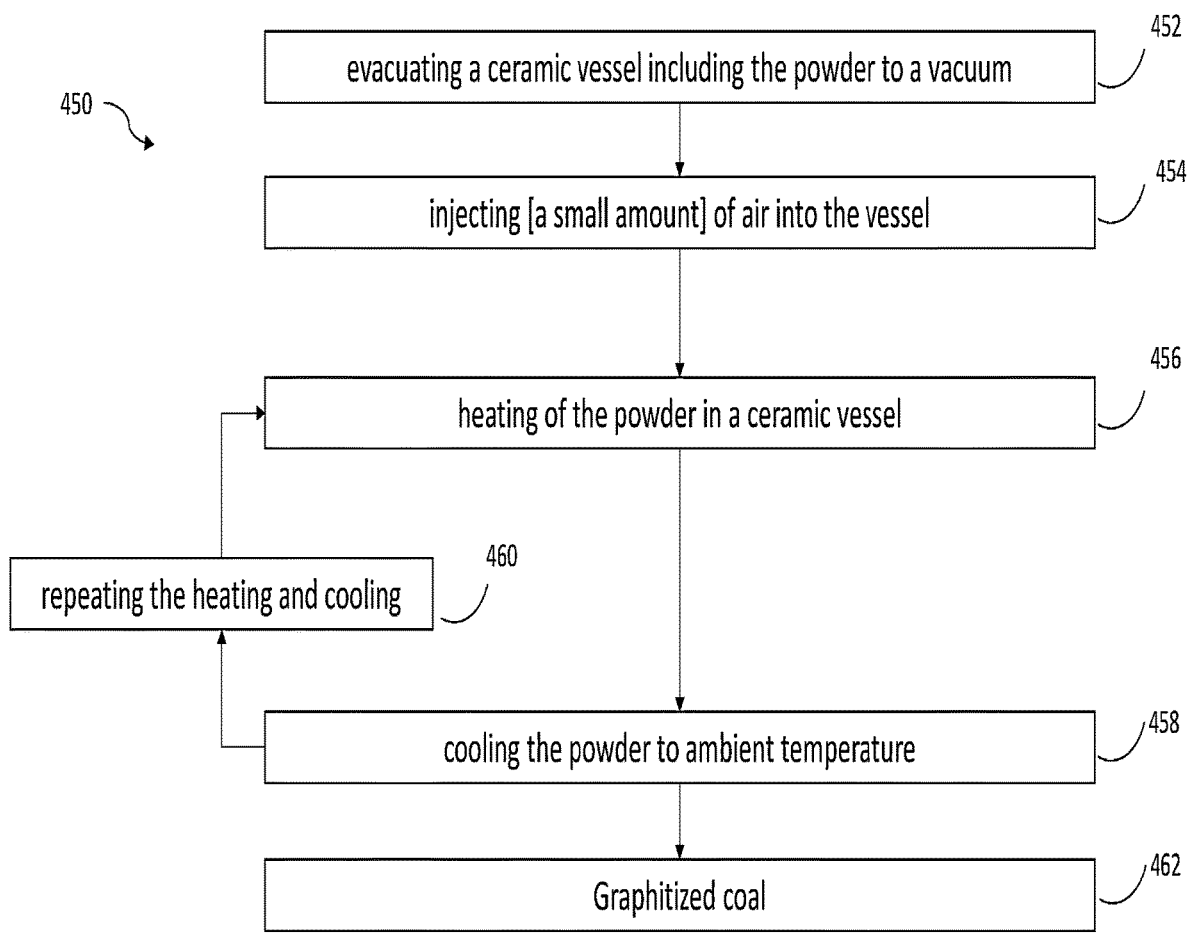
FIG. 4B is a flow chart of a graphitization process, according to an embodiment.

FIG. 4B is a flow chart of a graphitization process 450 of block 406 of FIG. 4A, according to an embodiment. The graphitization process 450 can include evacuating a ceramic vessel including the powder to a vacuum, as shown in block 452. In some embodiments, the vessel can include a material other than ceramic. The material of the vessel should be an insulator. In some embodiments, the graphitization process 450 can further include injecting [a small amount] of air into the vessel, as shown in block 454. The process 450 can include heating of the powder in a ceramic vessel, as shown in block 456. In some embodiments, the heating of the powder can include heating to a temperature of about 1800° C. to about 2600° C. and maintaining the temperature for about 1-8 hours or other suitable time. In some embodiments, the powder may heated to a temperature of about 1500° C. or greater, about 1800° C. or greater, about 2000° C. or greater, about 2200° C. or greater, about 2400° C. or greater, or in ranges of about 1500° C. to about 1800° C., about 1800° C. to about 2000° C., or about 2000° C. to about 2600° C. The graphitization process 450 can further include cooling the powder to ambient temperature as shown in block 458. As shown in block 460, the evacuation, air-injection, heat treatment, and cooling, can be repeated multiple times as a cyclic process. The process of block 160 can be repeated until achieving full graphitization of the coal, as shown in block 462.

Figure 4C:
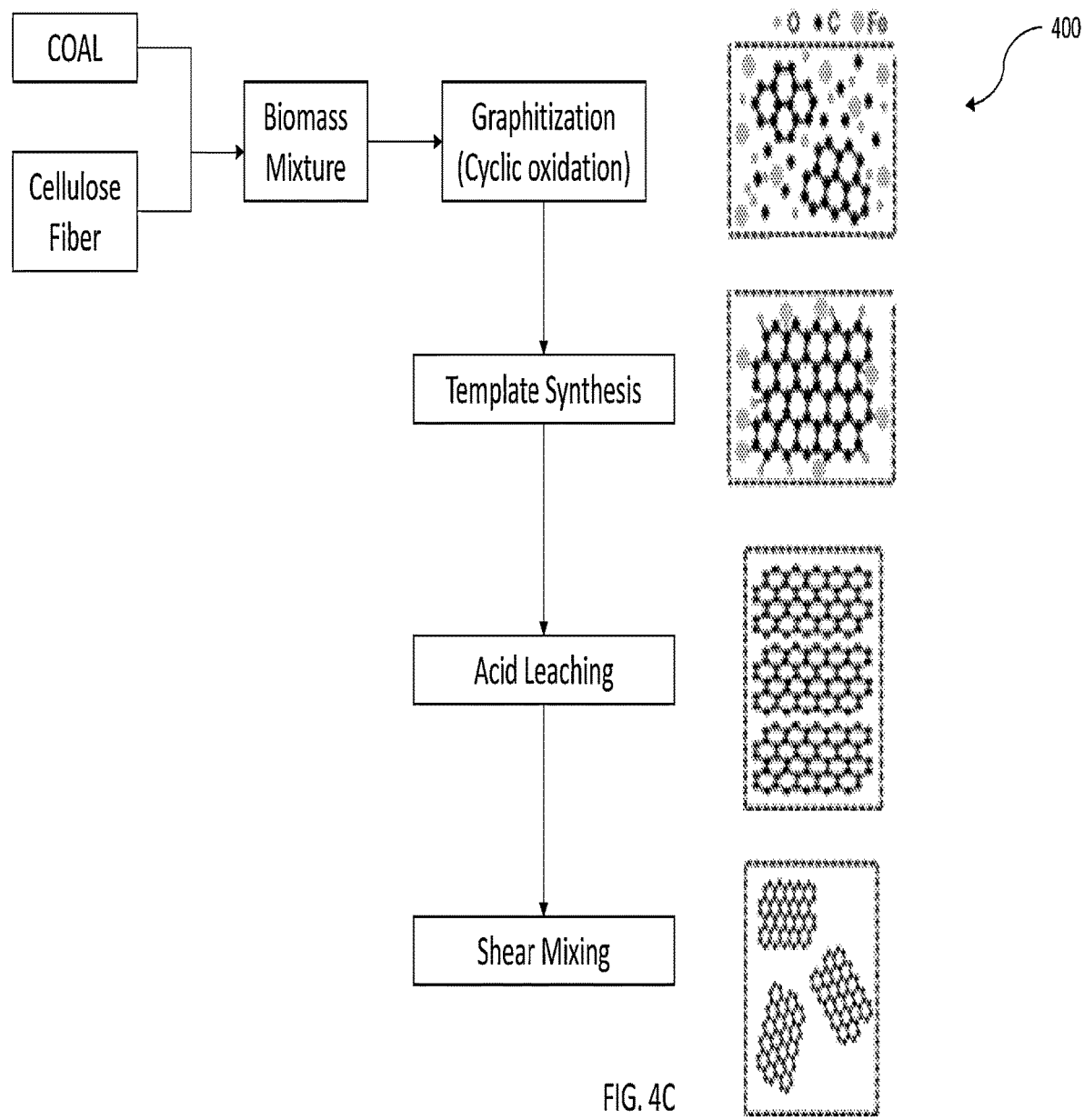
FIG. 4C is a schematic illustration of a method to convert coal to graphene, according to an embodiment.

FIG. 4C is a schematic illustration of the method 400 to convert coal to graphene, according to an embodiment. FIG. 4C includes graphical depictions of the sample as the method 400 progresses. Before the cyclic heating, the ceramic tube will be evacuated to vacuum. In a following process, a small amount of air can be injected into the system. The system can be heated to a certain temperature for a period of time and allowed to cool to room temperature for the next round. The cyclic process, including evacuation, air-injection, heat treatment, and cooling, can be repeated multiple times until achieving full graphitization of the coal.

In some examples, pitch-based fiber can be obtained via a melt-spinning method. TGA can be performed to determine the stabilization parameters of the as-spun fibers, including temperature, heating rate, and holding time, preventing the as-spun fiber from fusing in the following carbonization process. In order to blend the coal-derived graphene with the pitch particles, the shear-mixed high-quality graphene can be dispersed into the polyalcohol (PVA) solution with certain concentration to prevent the agglomeration of graphene nanoparticles. The graphene/pitch blend with desirable characteristics can be melt-spun into fibers.

The low-density or other carbon fibers formed according to one or more of the methods and systems described herein may be utilized in a direct air capture (DAC) system, such as a thermoelectric DAC or DAC using coal-derived electroactive polymers (EAPs). Accordingly, also disclosed herein is a DAC system having a low-density carbon fiber according to any of the systems and methods described above. In some embodiments, a DAC system using coal-derived EAPs may not include low-density carbon fibers and may additionally or alternatively include other coal derived materials, such as coal-derived graphene or graphene oxide.

The coal-derived EAPs may be formed from anthracene. In some embodiments, coal can undergo liquefaction effective to produce anthracene and/or other polycyclic aromatic hydrocarbons (PAH). The coal-derived anthracene may then be oxidized effective to form anthraquinone or a similar product. The anthraquinone may then be chlorinated using, for example, hydrochloric acid effective to form dichloroanthraquinone. The dichloroanthraquinone can then be polymerized effective to form an EAP.

The coal-derived EAP can retain ketone functionality, which promotes carbon dioxide binding to the EAP when a voltage is applied thereto. Once the EAP binding sites are saturated with bound or adsorbed carbon dioxide, the polarity of the voltage can be reversed, resulting in bound carbon dioxide debinding or being emitted from the EAP high quantities. As the polarity can be reversed in a battery or other system comprising the EAPs, separate materials are not needed for the anode and the cathode in the system. These properties allow use of feed gases having relatively low concentrations of carbon dioxide (415 ppm in air, for example), with the ability to pass the increase the amount of bound carbon dioxide with multiple passes of the feed gas over the EAP. In some embodiments, carbon nanotubes, graphene, graphene oxide, and/or other coal-derived conductive carbon materials can also be added to the system to increase conductivity of the components including the EAPs.

The thermoelectric DAC system or DAC system using coal-derived EAPs may be used in a variety of settings. For example, the thermoelectric DAC system or DAC system using coal-derived EAPs may be used to counter the negative effects of carbon dioxide during a new building or structure construction. Panel-like structures including the thermoelectric DAC system or DAC system using coal-derived EAPs may be added to the buildings to capture carbon dioxide during and after construction of the buildings. The buildings, then, may harvest carbon dioxide in the thermoelectric DAC system or DAC system using coal-derived EAPs. The carbon dioxide captured in the thermoelectric DAC system or DAC system using coal-derived EAPs built into the building may be utilized in numerous materials, such as conversion into hydrocarbon material(s) or a reverse water gas shift that converts the carbon dioxide into syngas and densified liquid(s).

As used herein, the term "about" or "substantially" refers to an allowable variance of the term modified by "about" or "substantially" by +10% or +5%. Further, the terms "less than," "or less," "greater than," "more than," or "or more" include, as an endpoint, the value that is modified by the terms "less than," "or less," "greater than," "more than," or "or more."

While various aspects and embodiments have been disclosed herein, other aspects and embodiments are contemplated. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Features from any of the disclosed embodiments may be used in combination with one another, without limitation. In addition, other features and advantages of the present disclosure will become apparent to those of ordinary skill in the art through consideration of the following detailed description and the accompanying drawings. Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including" and "having" come as used in the specification and claims shall have the same meaning as the term "comprising."

Terms of degree (e.g., "about," "substantially," "generally," etc.) indicate structurally or functionally insignificant variations. In an example, when the term of degree is included with a term indicating quantity, the term of degree is interpreted to mean ±10%, ±5%, or ±2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A method of producing carbon fiber, the method comprising:
    subjecting raw coal to a liquefaction process to form a pitch or a pitch resin;
    refining the pitch or pitch resin to produce a mesophase pitch with a degree of anisotropy between 20% and 99%;
    blending graphene with a thermoplastic blend additive and the mesophase pitch;
    subjecting the mesophase pitch or pitch resin to a low-crystallinity spinning process to form raw fiber;
    subjecting the raw fiber to a fiber stabilization process using oxygen to produce stabilized carbon fibers; and
    subjecting the stabilized carbon fiber to a carbonization process to form a carbonized or calcinated carbon fiber.

2. The method of claim 1, wherein the pitch or pitch resin comprises an isotropic pitch.

3. The method of claim 1, further comprising distilling coal tar to produce the pitch or pitch resin.

4. The method of claim 1, further comprising heat treating coal tar to produce the pitch or pitch resin.

5. The method of claim 1, further comprising stabilizing the raw fiber, wherein stabilizing the raw fiber includes heating the pitch to a stabilization temperature of about 280° C. and maintaining the pitch at the stabilization temperature for about 2 hours.

6. The method of claim 1, wherein subjecting the raw fiber or stabilized fiber to a carbonization process includes heating the raw fiber to a carbonization temperature of about 1000° C. and maintaining the raw fiber at the carbonization temperature for about 30 minutes.

7. The method of claim 1, wherein subjecting the raw fiber or stabilized fiber to a carbonization process includes heating the raw fiber in an inert gas environment.

8. The method of claim 1, wherein the carbon fiber comprises a tensile strength of from about 1.51 GPa to about 1.64 GPa and a modulus of about 356 GPa.

* * * * *